US011294453B2

(12) United States Patent
Olah-Reiken et al.

(10) Patent No.: US 11,294,453 B2
(45) Date of Patent: Apr. 5, 2022

(54) SIMULATED REALITY CROSS PLATFORM SYSTEM

(71) Applicant: Foretell Studios, LLC, New York, NY (US)

(72) Inventors: Howard Olah-Reiken, Hoboken, NJ (US); Lyron L. Bentovim, Demarest, NJ (US)

(73) Assignee: Foretell Studios, LLC, New York, NY (US)

( * ) Notice: Subject to any disclaimer, the term of this patent is extended or adjusted under 35 U.S.C. 154(b) by 0 days.

(21) Appl. No.: 16/857,015

(22) Filed: Apr. 23, 2020

(65) Prior Publication Data

US 2020/0341541 A1 Oct. 29, 2020

Related U.S. Application Data

(60) Provisional application No. 62/837,468, filed on Apr. 23, 2019.

(51) Int. Cl.
*G06F 3/01* (2006.01)
*G06T 19/00* (2011.01)
*G06T 13/40* (2011.01)

(52) U.S. Cl.
CPC .............. *G06F 3/011* (2013.01); *G06T 13/40* (2013.01); *G06T 19/006* (2013.01); *G06T 2219/024* (2013.01)

(58) Field of Classification Search
CPC ....... G06F 3/011; G06T 19/006; G06T 13/40; G06T 2219/024
See application file for complete search history.

(56) References Cited

U.S. PATENT DOCUMENTS

| 8,788,973 | B2 * | 7/2014 | Lavigne | A63F 13/655 |
| | | | | 715/848 |
| 9,122,321 | B2 * | 9/2015 | Perez | G06F 21/00 |
| 9,824,497 | B2 * | 11/2017 | Goto | G06T 7/74 |
| 9,836,268 | B2 * | 12/2017 | Shiraishi | G06T 13/40 |
| 10,205,910 | B2 * | 2/2019 | Valli | G03B 21/00 |
| 10,228,760 | B1 * | 3/2019 | Ross | G06T 13/40 |
| 10,306,180 | B2 * | 5/2019 | McLoughlin | A63F 13/355 |
| 10,410,395 | B2 * | 9/2019 | Nakabo | G06F 3/0346 |
| 10,496,158 | B2 * | 12/2019 | Terahata | G02B 27/0093 |
| 10,924,586 | B2 * | 2/2021 | Bastide | H04L 67/10 |
| 2010/0169798 | A1 * | 7/2010 | Hyndman | A63F 13/12 |
| | | | | 715/757 |

(Continued)

*Primary Examiner* — Amy Onyekaba
(74) *Attorney, Agent, or Firm* — Fox Rothschild LLP

(57) ABSTRACT

A simulated reality system is disclosed herein. The simulated reality system receives information from the sensor determinable as at least one of a position or orientation of a user of the device. The simulated reality system transmits the information to the simulated reality environment generator for converting the information to a corresponding avatar position or orientation within the simulated reality environment and for subsequent transmission of the avatar position or orientation within the simulated reality environment to at least one of a second device or simulated reality device. The handheld device receives information from the simulated reality environment generator. The information corresponds to the viewing perspective of the avatar in the simulated reality environment for display on the viewing device.

19 Claims, 12 Drawing Sheets

(56) References Cited

U.S. PATENT DOCUMENTS

| | | | |
|---|---|---|---|
| 2010/0169799 A1* | 7/2010 | Hyndman | A63F 13/12 718/1 |
| 2011/0216002 A1* | 9/2011 | Weising | A63F 3/02 345/158 |
| 2011/0292181 A1* | 12/2011 | Acharya | G06F 21/32 348/47 |
| 2012/0086631 A1* | 4/2012 | Osman | A63F 13/525 345/156 |
| 2012/0094773 A1* | 4/2012 | Suzuki | A63F 13/79 463/43 |
| 2012/0299827 A1* | 11/2012 | Osborn | G09G 5/08 345/158 |
| 2012/0304126 A1* | 11/2012 | Lavigne | A63F 13/428 715/848 |
| 2013/0044128 A1* | 2/2013 | Liu | G02B 27/017 345/633 |
| 2013/0050260 A1* | 2/2013 | Reitan | G06F 8/315 345/633 |
| 2013/0117377 A1* | 5/2013 | Miller | G06F 3/013 709/205 |
| 2015/0046244 A1* | 2/2015 | Baxter | G06Q 30/0261 705/14.23 |
| 2015/0097719 A1* | 4/2015 | Balachandreswaran | G01B 11/002 342/147 |
| 2016/0059120 A1* | 3/2016 | Komorous-King | A63F 13/211 463/36 |
| 2016/0093108 A1* | 3/2016 | Mao | A63F 13/493 345/633 |
| 2016/0187969 A1* | 6/2016 | Larsen | A63F 13/211 345/156 |
| 2016/0247309 A1* | 8/2016 | Li | G06F 3/04883 |
| 2017/0024932 A1* | 1/2017 | Sugaya | G02B 27/0093 |
| 2017/0045941 A1* | 2/2017 | Tokubo | H04S 7/304 |
| 2017/0102766 A1* | 4/2017 | Hayashida | G06F 3/147 |
| 2017/0153863 A1* | 6/2017 | Shiraishi | A63F 13/537 |
| 2017/0206691 A1* | 7/2017 | Harrises | G06T 11/60 |
| 2017/0364154 A1* | 12/2017 | Levesque | G06F 3/016 |
| 2018/0005429 A1* | 1/2018 | Osman | G06T 19/006 |
| 2018/0096519 A1* | 4/2018 | Tokubo | G06F 3/012 |
| 2018/0096533 A1* | 4/2018 | Osman | G02B 27/0093 |
| 2018/0104573 A1* | 4/2018 | Jeffery | A63F 13/27 |
| 2018/0196506 A1* | 7/2018 | Nakashima | G06F 3/017 |
| 2018/0204369 A1* | 7/2018 | Nakabo | G06F 3/014 |
| 2018/0260023 A1* | 9/2018 | Perlin | G06F 1/1626 |
| 2018/0268589 A1* | 9/2018 | Grant | G06F 3/017 |
| 2018/0286122 A1* | 10/2018 | Nakashima | G06F 3/012 |
| 2018/0288391 A1* | 10/2018 | Lee | G06F 3/011 |
| 2018/0300926 A1* | 10/2018 | Inomata | G06F 3/011 |
| 2018/0311585 A1* | 11/2018 | Osman | H04L 67/38 |
| 2018/0329486 A1* | 11/2018 | Williams | G02B 27/017 |
| 2018/0329604 A1* | 11/2018 | Nakabo | G06F 3/04815 |
| 2018/0341386 A1* | 11/2018 | Inomata | G02B 27/0093 |
| 2019/0073830 A1* | 3/2019 | Fujimoto | H04N 21/6587 |
| 2019/0310757 A1* | 10/2019 | Lee | G06F 3/017 |
| 2019/0310761 A1* | 10/2019 | Agarawala | G06F 3/0485 |
| 2019/0374857 A1* | 12/2019 | Deller | H04L 67/38 |
| 2020/0117267 A1* | 4/2020 | Gibson | G06F 3/011 |
| 2020/0117270 A1* | 4/2020 | Gibson | G06T 7/74 |
| 2020/0234481 A1* | 7/2020 | Scapel | A63F 13/213 |
| 2020/0341541 A1* | 10/2020 | Olah-Reiken | G06T 19/006 |
| 2020/0388052 A1* | 12/2020 | Fukasawa | G06T 19/00 |
| 2021/0308578 A1* | 10/2021 | Benzies | A63F 13/65 |

\* cited by examiner

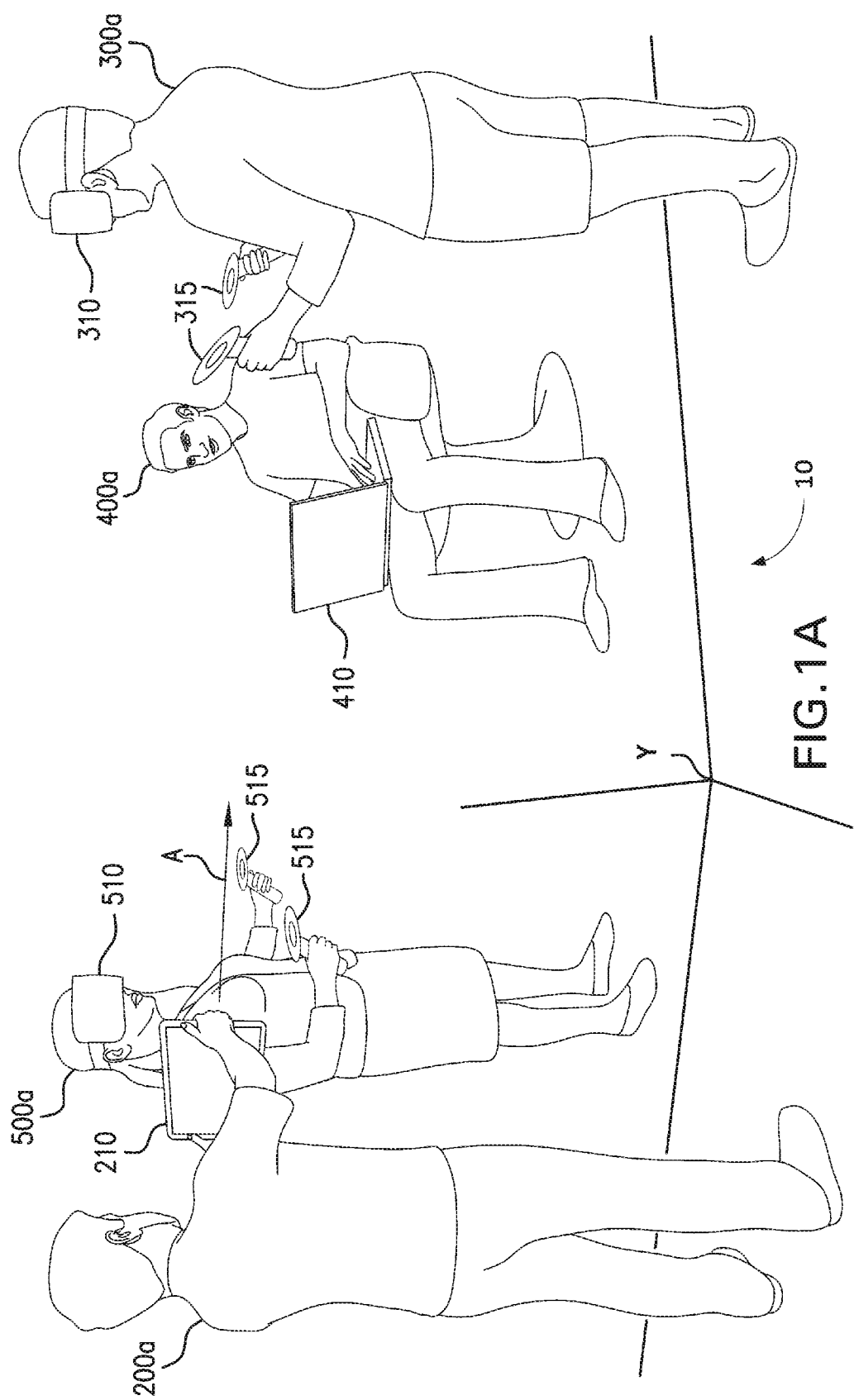

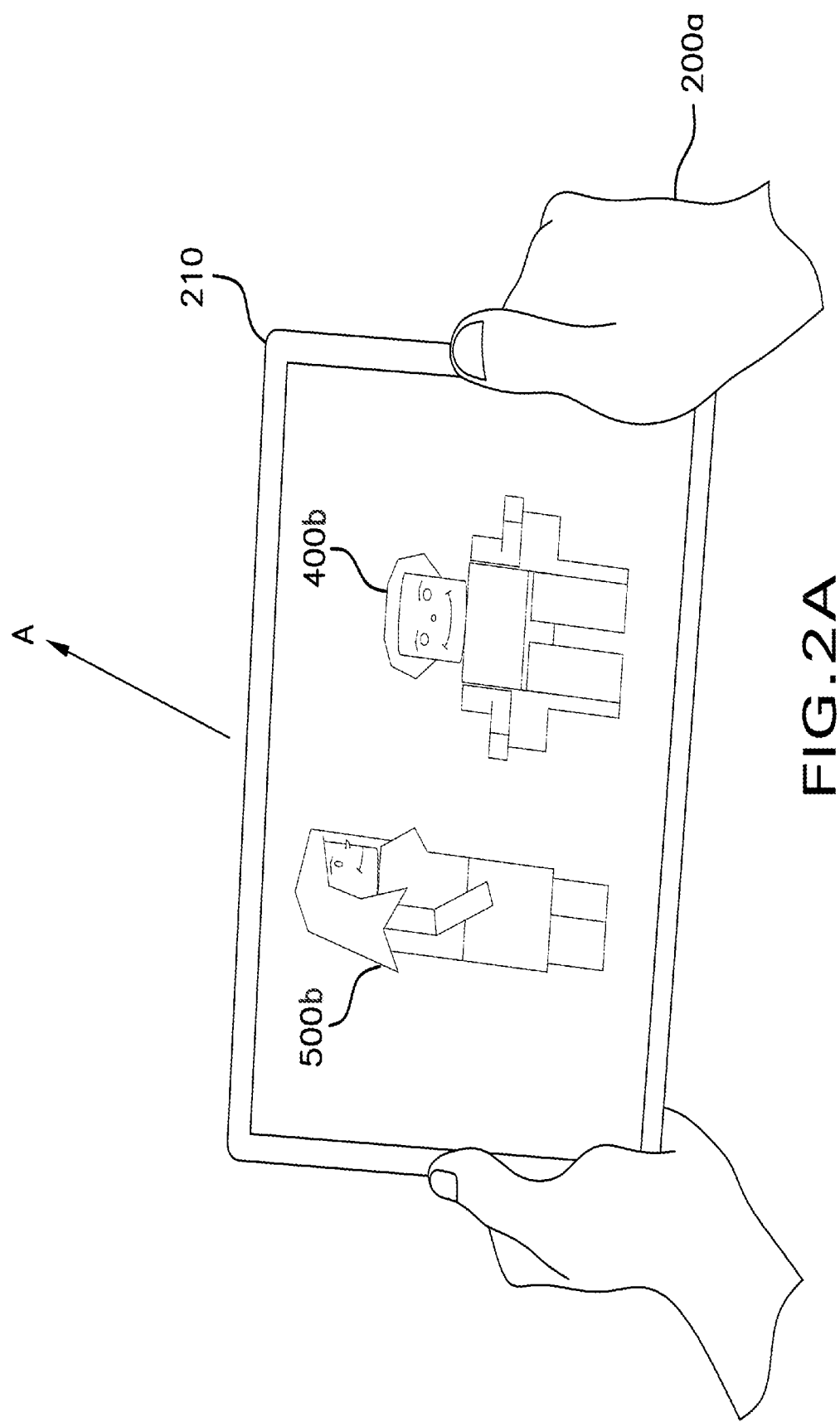

SIMULATED REALITY CROSS PLATFORM SYSTEM

CROSS-REFERENCE TO RELATED APPLICATION

This application claims priority to U.S. Provisional Application No. 62/837,468, filed on Apr. 23, 2019, the disclosure of which is incorporated by reference herein in its entirety.

TECHNICAL FIELD

A system for displaying a simulated reality system, more particularly, one that allows a user to change perspectives within the simulated reality environment while communicating this change in perspective to other simulated reality system users by reflecting those changes via asset reorientation.

BACKGROUND

Traditional multiuser virtual reality systems allow users to interact with other users who appear to be co-located even though they may actually be in different physical locations. In such systems, the users appear in the same immersive environment and may communicate with each other and interact with shared aspects of the environment. The users use some type of virtual reality head mounted display.

Users, however, who are not using virtual reality head mounted displays cannot participate in these experiences. As a result, some users cannot attend immersive meetings, productivity sessions and other events, or all participants will have to use traditional non-virtual methods, which can limit productivity, and which are less convenient, less immersive and in some cases impossible due to differences in physical locations.

SUMMARY

In accordance with various embodiments, a simulated reality system is provided. The simulated reality system receives information from the sensor determinable as at least one of a position or orientation of a user of the device. The simulated reality system transmits the information to the simulated reality environment generator for converting the information to a corresponding avatar position or orientation within the simulated reality environment and for subsequent transmission of the avatar position or orientation within the simulated reality environment to at least one of a second device or simulated reality device. The handheld device receives information from the simulated reality environment generator. The information corresponds to the viewing perspective of the avatar in the simulated reality environment for display on the viewing device. Each avatar is computer-generated information associated with each asset or user within the environment.

In an embodiment, a simulated reality system is provided that includes a viewing device configured to display information from a simulated reality environment; a sensor configured to establish at least one of a position or orientation of the viewing device; and an information transmission device in communication with a simulated reality environment generator for generating display information for display on the viewing device defining the simulated reality environment. The simulated reality system includes a non-transitory memory containing computer-readable instructions operable to cause display of and adjust the display information in the simulated reality environment; and a processor configured to process instructions for adjusting and displaying information in the simulated reality environment. The processor configured to receive, from the viewing device, sensor information from the sensor determinable as at least one of a position or orientation of a user of the viewing device; and process the sensor information by the remote simulated reality environment generator to convert the sensor information to a corresponding position or orientation of a first asset within the simulated reality environment. The processor configured to transmit of the position or orientation of the first asset within the simulated reality environment to one or more of second viewing devices or simulated reality viewing devices; and cause a viewing perspective of the first asset in the simulated reality environment for display on the one or more of the second viewing devices or the simulated reality viewing devices to be updated in response to the asset position or orientation of the first asset relative to a viewing perspective of the one or more viewing devices.

In some embodiments, a user input device is provided that is configured to selectively adjust the avatar by causing the avatar to gesticulate or emote in a manner displayable to a user interacting with the simulated reality environment from a simulated reality device.

In some embodiments, the input device is configured to adjust the asset by causing the asset to change position within the simulated reality environment.

In some embodiments, the first asset is an avatar representation of the user displayed in the simulated reality environment.

In some embodiments, the viewing device is a handheld device and the sensor includes a gyroscope configured to provide information indicative of the direction the handheld device is pointed.

In some embodiments, the gyroscope sensor information is converted by the remote simulated reality environment generator and the handheld device is configured to receive the converted sensor information to display the simulated reality environment in a direction that corresponds to the direction the handheld device is pointed.

In some embodiments, the sensor includes an accelerometer configured to provide information indicative of the direction the handheld device is pointed.

In some embodiments, the accelerometer information is converted by the simulated reality generator and the handheld device is configured to receive the converted sensor information to display the simulated reality environment in a direction that corresponds to the direction the handheld device is pointed.

In some embodiments, the handheld device includes a sensor configured to provide at least one of the position or orientation of the user.

In an embodiment, a simulated reality system is provided that includes a plurality of viewing devices, at least one viewing device is a handheld viewing device. The at least one handheld viewing device is configured to display computer-generated display information from a simulated reality environment. Each handheld viewing device includes a sensor configured to establish at least one of a position or orientation of the corresponding handheld viewing device. The handheld viewing device includes a communication device in communication with a simulated reality environment generator configured to generate the computer-generated display information for display on the plurality of viewing devices defining the simulated reality environment. The handheld device includes a non-transitory memory containing computer-readable instructions operable to display and adjust display of the computer-generated display information in the simulated reality environment. The handheld device includes a processor configured to process instructions for adjusting and displaying information in the simulated reality environment. The process is configured to receive sensor information from the sensor determinable as at least one of a position or orientation of a user of the corresponding hand-held viewing device; transmit the information to the simulated reality environment generator, the simulated reality environment generator configured to convert the sensor information to a corresponding avatar position or orientation within the simulated reality environment; receive the converted sensor information from the simulated reality environment generator corresponding to a viewing perspective of the avatar in the simulated reality environment for display on the corresponding handheld viewing device; and display the received simulated reality environment information by the corresponding handheld viewing device, in accordance with the viewing perspective of the avatar.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 1A and FIG. 1B illustrate examples of multiple users operating across platforms with a simulated reality environment in accordance with various embodiments disclosed herein;

FIG. 2A and FIG. 2B illustrate a simulated reality environment for cross platforming user input between a hand-held device and other connected devices;

Figure 1B:
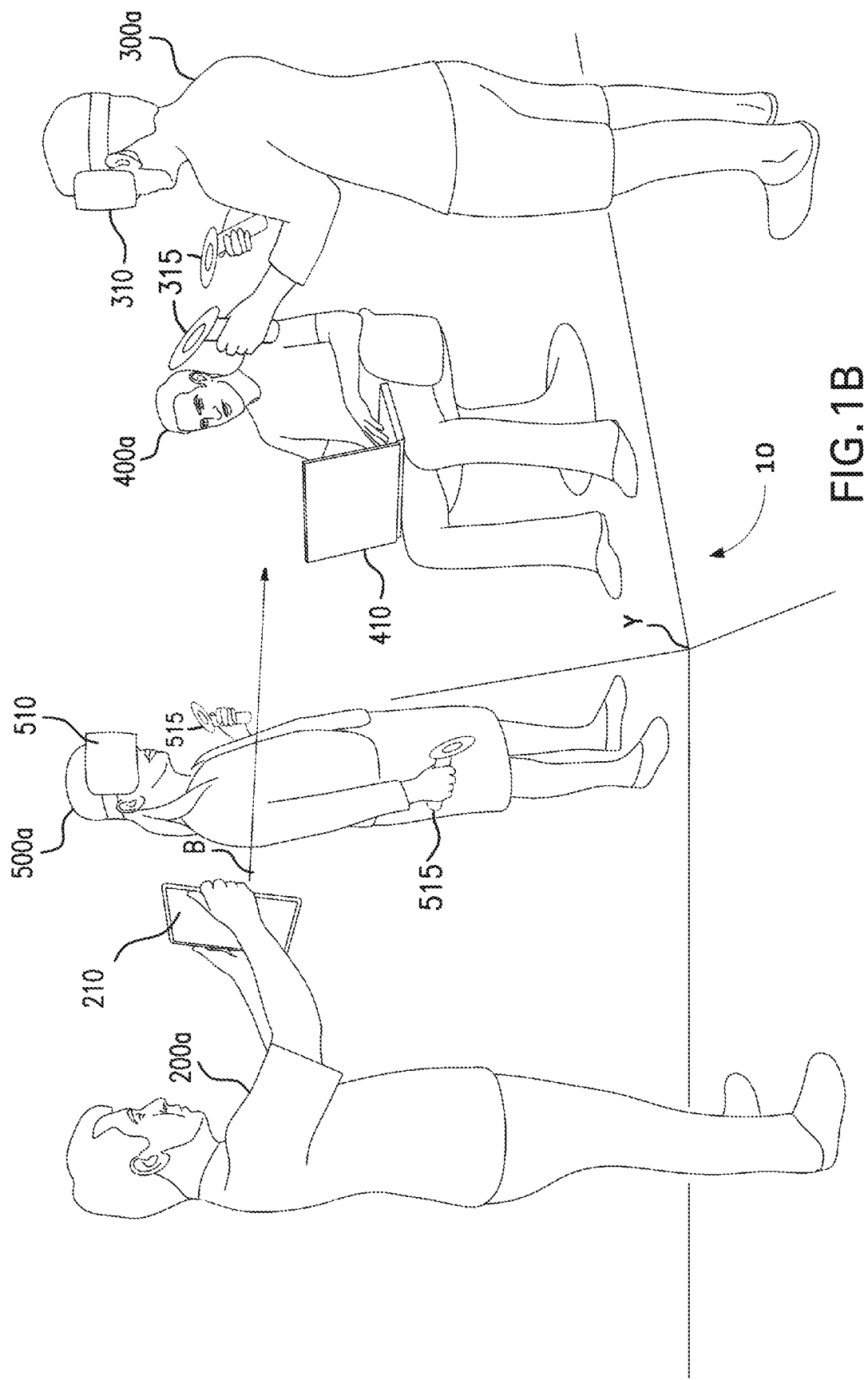

All figures are arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein and illustrated in the Figures, can be arranged, substituted, combined, separated, and designed in a wide variety of different configurations, all of which are implicitly contemplated herein.

The simulated reality system used herein may be a virtual reality system or augmented reality systems accompanied with a computer feed. Augmented reality system may provide a mixed reality experience. Embodiments of augmented reality systems include a camera so that the display displays virtual assets on a video image from the camera. Virtual reality (VR) systems include environments that are three-dimensional (3D) representations of real or virtual worlds. Virtual reality systems can be displayed on two-dimensional (2D) devices such as a computer screens, mobile devices, or other suitable 2D displays. Virtual reality systems can also be displayed in 3D such as on a 3D displays (e.g., 3D screens, WebVR, VR headsets, etc.) or hologram. Examples of virtual reality include can include traditional 3D representations on a 2D displays. Virtual reality systems render environments that can be either partially or entirely virtual. In VR environments, the user experiences a virtual world. Each type of virtual reality system may have assets that are simulated realities (i.e., corresponds to) real world items, objects, places, people, or similar entities.

A system for displaying a virtual reality environment or augmented reality is provided herein. In accordance with various embodiments discussed herein, the system allows a user to manipulate perspectives of the virtual reality environment while communicating this change in perspective to other virtual reality system users by reflecting those changes via asset reorientation viewable in the virtual reality environment by connected devices. The system disclosed herein in various embodiments, allows one or more users on non-immersive display devices to participate with and collaborate with one or more immersive display device users in a virtual reality environment. These multi-user cross platform experiences can be applicable to, but are not limited to, live events such as meet-ups, sporting and eSports events, theatrical events, educational lectures, support groups and productivity meetings. In various embodiments, the systems disclosed here can also allow for a non-immersive user to experience a solo virtual reality environment.

In accordance with various embodiments, the systems disclosed herein allow a user to join virtual reality or augmented reality sessions, using an application on a non-immersive device. In accordance with various embodiments, these devices can emulate a user's head and/or hand position. The position of the head and/or hands can be represented in the virtual reality environment such that other users see the virtual position of the emulated user position. In some embodiments, the position of the non-immersive device can also manipulate the perspective by which the user views the virtual reality environment. Such manipulation can be accomplished when using movable devices, such as smart phones, tablets, and augmented reality glasses. In such embodiments, a user can move their device around them, looking in any direction, and see on their device's screen, where that portion of the virtual reality environment that would be seen where the user is in the virtual reality system and looking in that direction. The correct position, orientation and point of view of the user is determined by input from the devices sensors. In accordance with various embodiments, to the users using the system from immersive devices such as headsets, any non-immersive user appears as an avatar with that avatar having position, orientation and movement within the environment. The position of the head and/or hands of the avatars are positioned relative to where the user is holding the device. In some embodiments, additional adjustments to the head and/or hands may be made via graphical user interface input elements and/or input devices.

Multi-user simulated reality systems, such as a virtual reality systems include instances of virtual reality applications that communicate with other instances of the virtual reality application that are registered with the same server and whose users have entered the same shared environment on that server. The system can use Remote Procedure Calls (RPC's) often wrapped in convenience functions or facilitated by platforms. This allows the system to communicate which assets should appear cloned in other running instances of the same application. The shared assets can include avatar features (e.g., hands, head, or other features) that represent themselves as users in the virtual environment. The shared assets also include any assets in the environment that all users need to see as the same asset, and to manipulate in ways that others can observe as well. The system can also use RPC's to communicate state changes that affect other running instances of the application, and to pass audio and textual data, which enable users to hear each other and chat with each other.

In accordance with various embodiments, instances on non-immersive devices will be able to send and receive analogous RPC's so that non-immersive device users and immersive device users see each other in comparable contexts and can interact with shared assets similarly or equally. Virtual reality instances on non-immersive devices and virtual reality instances on immersive devices can also remain in sync with respect to any state changes. This cross platform functionality stands in contrast to traditional systems that share and sync state changes amongst immersive instances. In various embodiments, audio and text data can also be shared comparably amongst virtual reality instances for non-immersive devices and virtual reality instances for immersive devices.

In accordance with various embodiments, the non-immersive instances register with the server the same way the immersive instances do. In some embodiments, the non-immersive instances use functions and utilities to send and receive RPC's that appear to the receiver in the same way the existing immersive versions do. As an example, in some instances, the rotation of a hand held mobile phone of table will be transmitted in a way that will be interpreted in the same way as the rotation of a user's head in a VR headset would. As a result, the phone or tablet user will see parts of the virtual world that would be seen if looking on that direction, and users in VR headsets will see phone or tablet user's avatar head move as though that user were turning their head in an actual headset. Virtual environments in the immersive experience will be adapted to and provided for display and interaction in the non-immersive instances.

FIG. 1A depicts an illustration of multiple users operating across different platforms utilizing a system for generating a simulated reality environment 10 (i.e., virtual reality environment and/or augmented reality). The system for generating a virtual reality environment 10 allows a plurality of different users from different platforms to accesses the same virtual reality environment. In accordance with various embodiments, the system 10 includes a viewing device (e.g., viewing devices 210, 310, 410, and/or 510) suitable for displaying display information from a virtual reality environment generated by the system 10. The viewing devices can include one or more of non-immersive viewers (e.g., users 200a, 400a, etc.) and/or immersive viewers (e.g., users 300a, 500a, etc.). Non-immersive display devices can include, for example, smart phones, tablets, laptops, desktop computers, smart TV's, virtual reality glasses, and/or similar suitable viewing devices. Immersive display devices can include virtual reality head-mounted displays (HMD). Examples of augmented reality glasses include Microsoft® HoloLens®, Magic Leap, Vusix®, etc. Examples of virtual reality HMDs include mobile devices (e.g., Oculus Go®, Oculus Quest®, Pico Interactive Inc., HTC Vive™ Focus, etc.) and high-end computer-tethered devices (e.g., Oculus Rift®, HTC Vive™, HTC Vive™ Pro, Windows® Mixed Reality). Additionally or alternatively, one or more of the viewing devices can be handheld movable devices such as smart phones, tablets, etc. Notably, the handheld movable devices can be a subset of the non-immersive viewers. Each avatar described herein is a computer generated image or character representation of or associated with a user.

In accordance with various embodiments, a user 200a utilizing a non-immersive device 210 interacts via the virtual reality environment 10 with an additional user or users, such as one or more of user 300a, user 400a, user 500a and/or other users. Preferably the non-immersive device is a handheld device 210 and the additional user 300a utilizes an immersive device 310 with a user input device or controller 315. Alternatively or additionally, the additional user may be user 400a that utilizes a semi movable non-immersive device 410 such as a laptop computer. Alternatively or additionally, the additional user may be user 500a that utilizes an operable augmented reality device 510 with a user input device or controller 515. In such embodiments, the simulated reality environment 10 can be generated entirely as an augmented reality system. In other embodiments, the simulated reality environment 10 can be generated entirely as a virtual reality environment by a virtual reality system. In yet other embodiments, the simulated reality environment 10 can be generated as a hybrid virtual reality and augmented reality system. User input device may include haptic devices, including body-worn haptic garments.

FIG. 1A illustrates an apparent single local environment for each of the users 200a, 300a, 400a, and/or 500a. While it is appreciated that the users may be local to one another, it is also understood that one or more of the users may be separated from the others as denoted by environmental lines "Y". In accordance with various embodiments, all of the users may be separated from one another such that the interaction between users is limited to the simulated reality environment 10. The illustration of FIG. 1A is shown with the illusion of locality in order to display a relative relationship between the users of the system that can then be recreated by the virtual reality system allowing the users to experience one another as though they are interacting locally via computer-generated avatar representations of the users. Simulated reality environment 10 can be provided in a simulated reality space, which can be virtual reality space or augmented reality space, such as a three-dimensional simulate or virtual space.

Avatar are normalized with respect to each other in the simulated reality environment 10 by being assigned positions in simulated space and scaled relatively to each other to allow them to interact in the simulated reality environment 10. For instance, the avatars can be positioned and scaled to appear close enough to interact with each other. Typically, the avatars are positioned in 6 dimensions in the simulated reality space, for instance in 3 Cartesian coordinate dimensions and 3 orientation/attitude dimensions, such as pitch, roll, and yaw. The assets can moved within the simulated reality environment 10 in dimensions of the simulated reality space.

In accordance with various embodiments, the system for generating a simulated reality environment 10 allows for the user interaction between the different user devices. For example, as shown in FIG. 1A, user 200a directs the non-immersive device 210 in direction A allowing input from the simulated reality environment generator 146 to display a first portion of the simulated reality environment 10. By way of example, the simulated reality environment 10 returns renderings of assets in the first portion of the environment, such as avatars 500b and 400b of users 500a and 400a, respectively, for display on device 210 as shown in FIG. 2A.

Figure 2B:
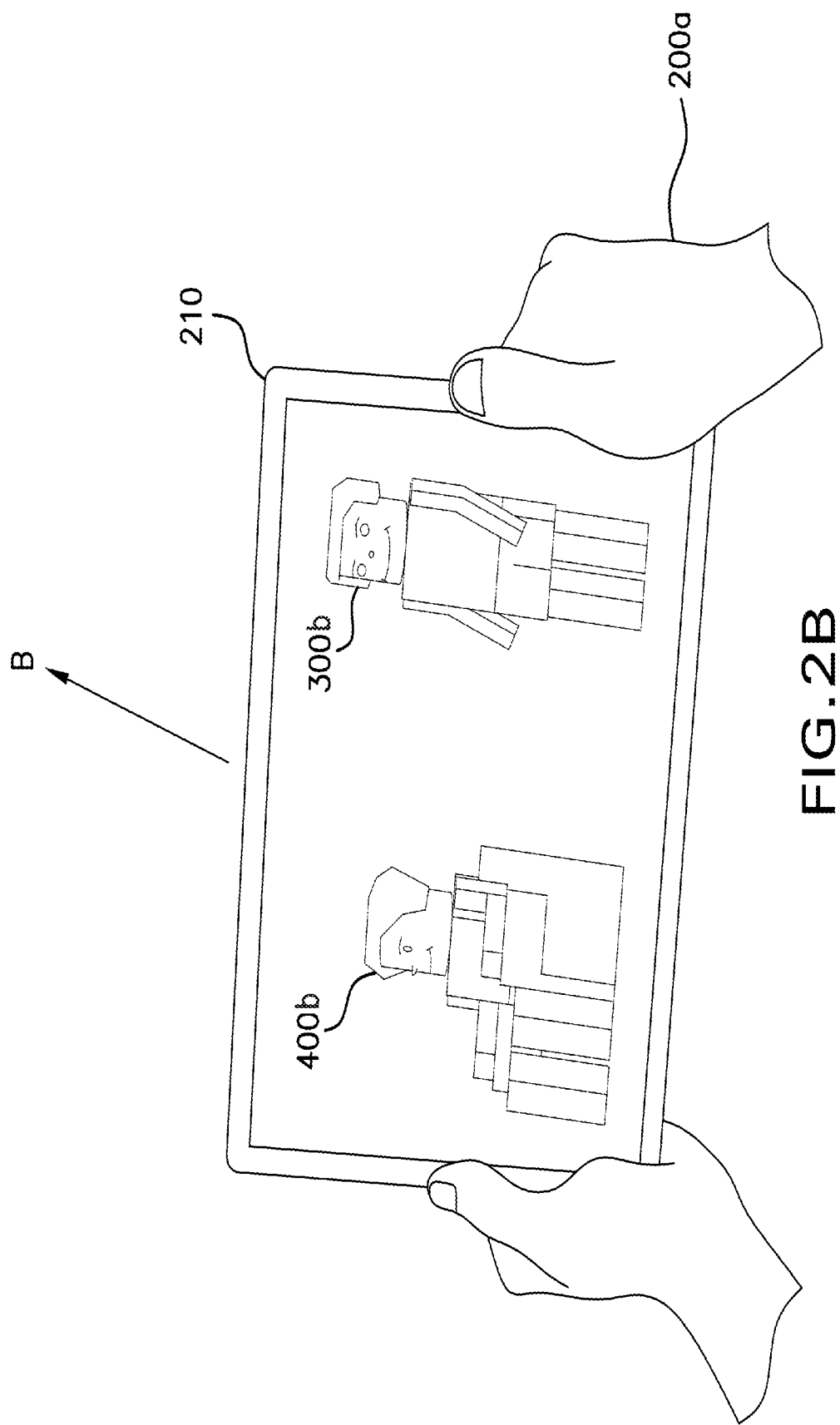

FIG. 1B illustrates an example of multiple users operating across platforms with a virtual reality environment 10. As shown in FIG. 1B, user 200a directs the handheld device 210 in direction B allowing input from the simulated reality environment generator 146 to display a second portion of the simulated reality environment. By way of example, the second portion of the simulated reality environment includes computer rendered assets, such as avatars 400b and 300b of users 400a and 300a, respectively, for display on device 210 as shown in FIG. 2B. Thus, motion of the non-immersive device 210 allows for viewing of different portion so and different assets within the simulated reality environment.

Figure 1C:
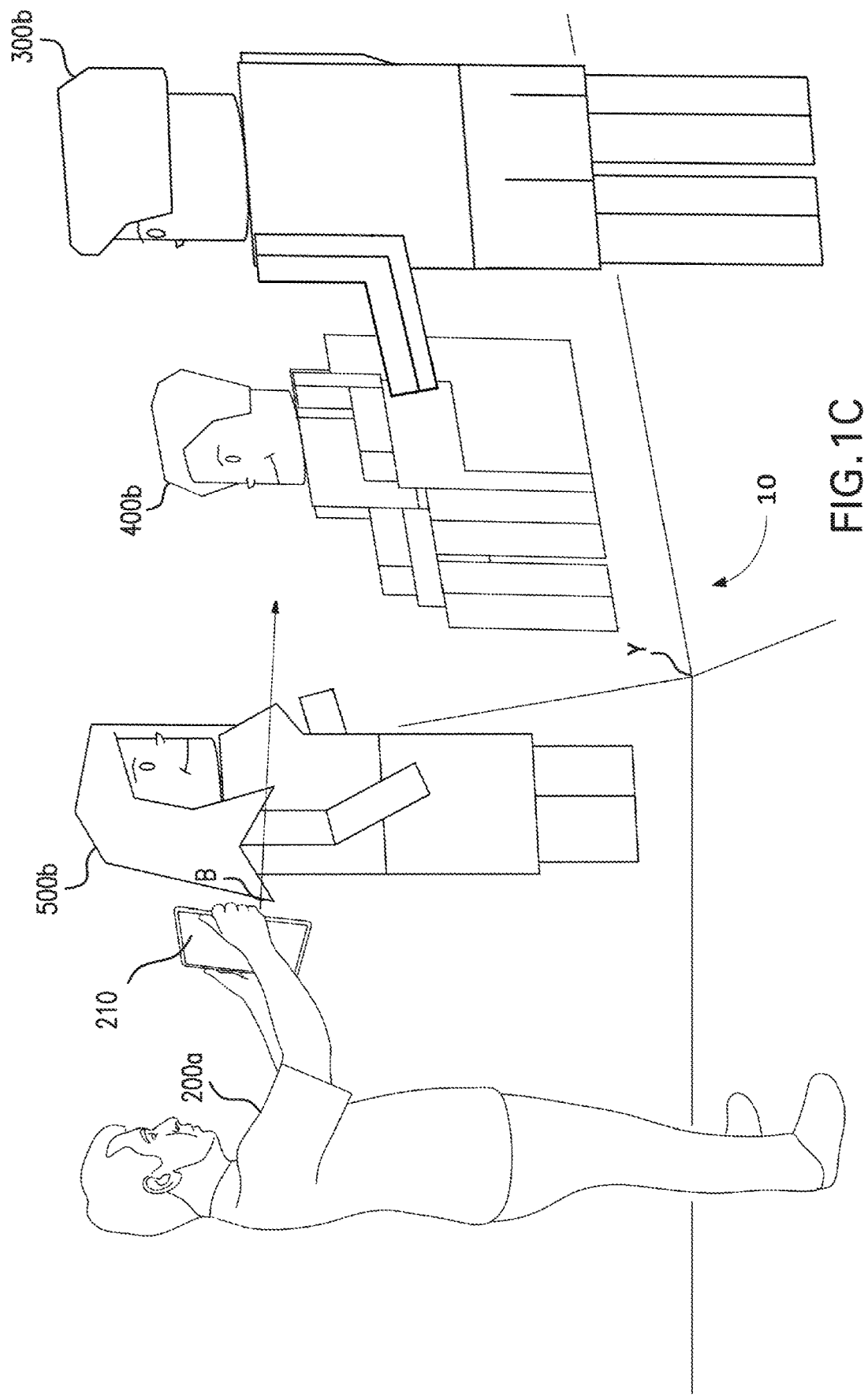
FIG. 1C illustrates the multiple users operating across platforms and showing the relative position that each of the avatars are assigned to appear as in FIG. 1A relative to a first user.

FIG. 1C illustrates the multiple users operating across platforms and showing the relative position that each of the avatars (i.e., avatars 300b, 400b and 500b) are assigned to appear as in FIG. 1A, illustrating how the viewing device 210 display is caused to show the avatars in spacial and scale relationship to the first user 200a. As the users move in the simulated reality space, the users' displays are caused to render the avatars from the appropriate perspectives.

Figure 6:
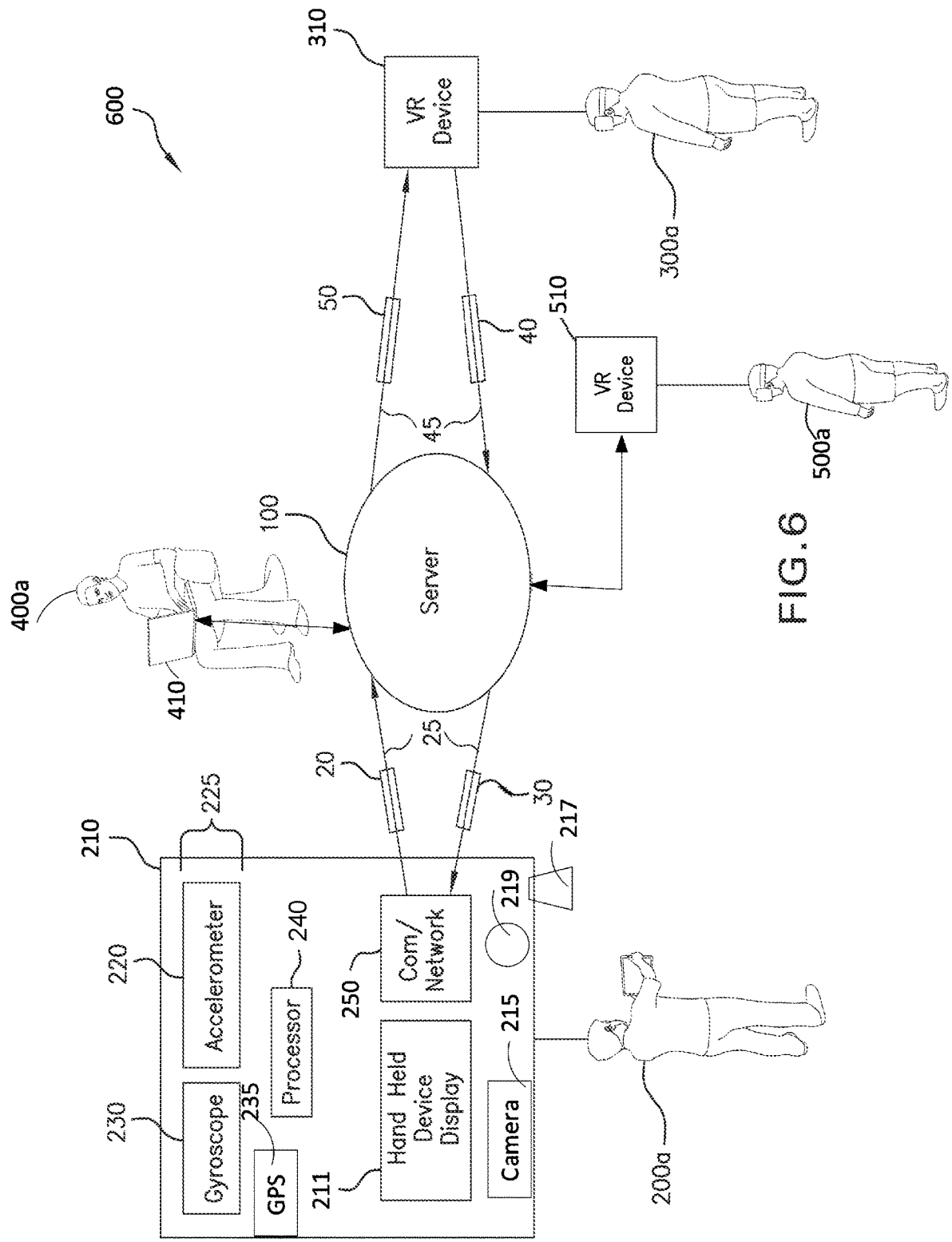
FIG. 6 illustrates block diagram of non-immersive viewing device in a simulated reality system.

The operation of the simulated reality system as shown in FIG. 6, will be described in detail in relation to FIG. 2A-2B. FIG. 2A illustrates a simulated reality environment 10 for cross platforming user input between a handheld device (i.e., viewing device 210) and other connected devices (i.e., viewing devices 310, 410 and 510) with the avatar 300b out of view. FIG. 2B illustrates a simulated reality environment 10 for cross platforming user input between a handheld device (i.e., viewing device 210) and other connected devices (i.e., viewing devices 310, 410 and 510) with avatar 500b out of view.

Figure 3A:
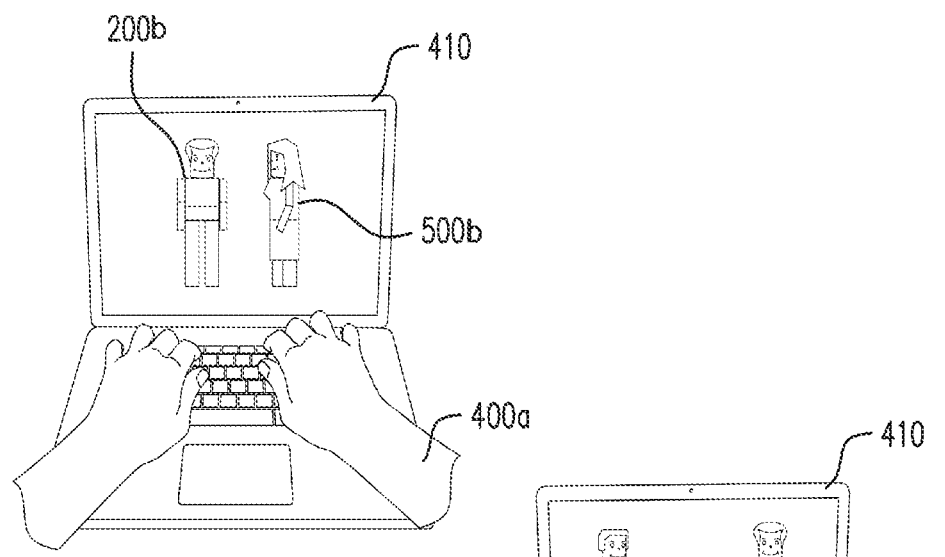
FIGS. 3A, 3B, and 3C illustrate a simulated reality environment for cross platforming user input between a computer and other connected devices.
Figure 3B:
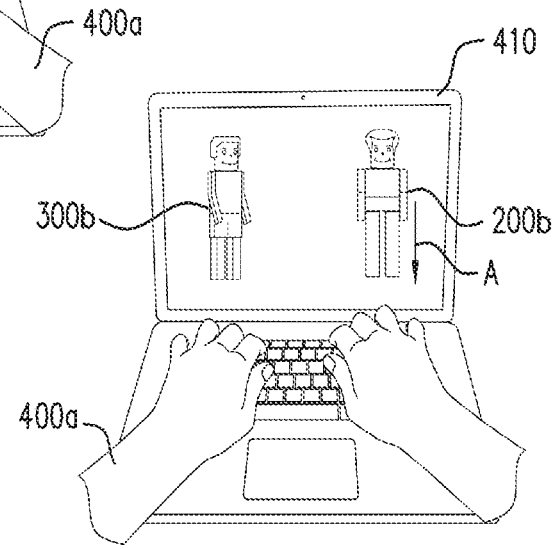
Figure 3C:
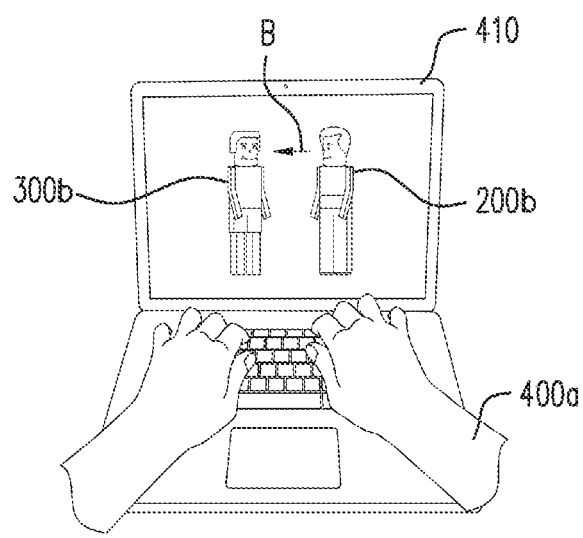

FIGS. 3A, 3B, and 3C illustrate a simulated reality environment for cross platforming user input between a computer (i.e., viewing device 410) and other connected devices (i.e., viewing devices 310, 410 and 510) with the avatar 300b out of view in FIG. 3A, with the avatar 500b out of view in FIG. 3B and FIG. 3C.

Figure 4A:
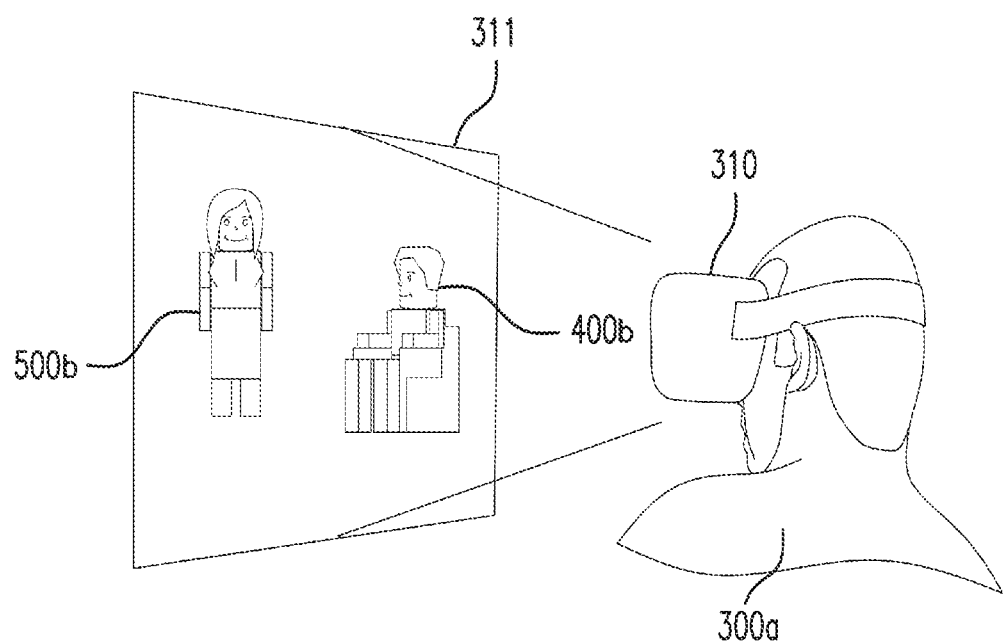
FIG. 4A and FIG. 4B illustrate a simulated reality environment for cross platforming user input between an immersive headset device and other connected devices.
Figure 4B:
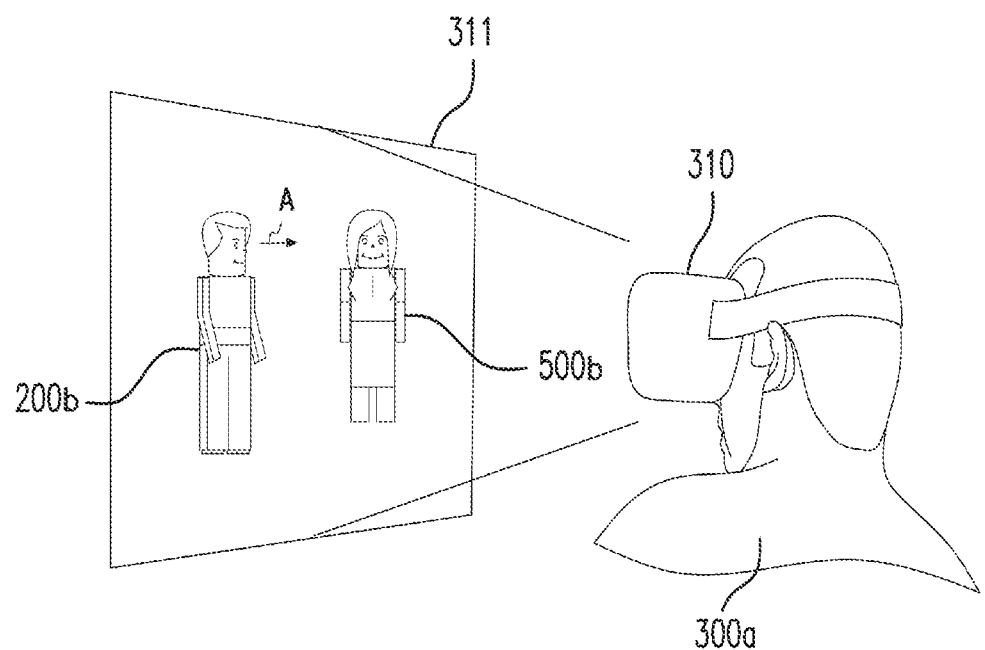

FIG. 4A and FIG. 4B illustrate a simulated reality environment for cross platforming user input between an immersive headset device (i.e., viewing device 310) and other connected devices (i.e., viewing devices 210, 410 and 510). In FIGS. 4A and 4B, the immersive headset device (i.e., viewing device 310) displays the simulated reality environment on a head mounted display (HMD) device 311.

Figure 5A:
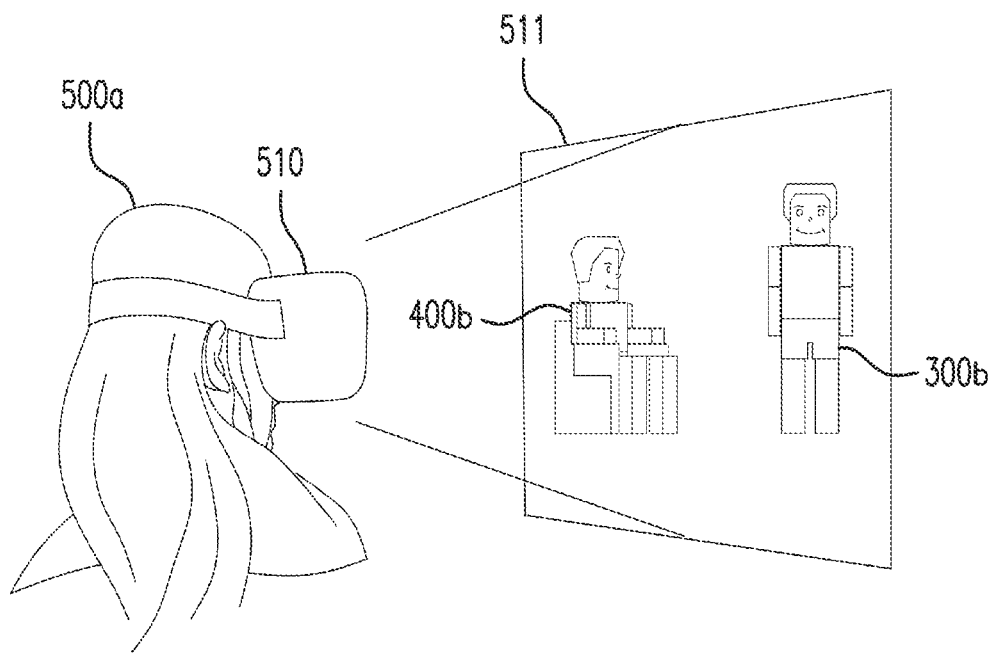
FIG. 5A and FIG. 5B illustrate a simulated reality environment for cross platforming user input between an immersive headset device and other connected devices.
Figure 5B:
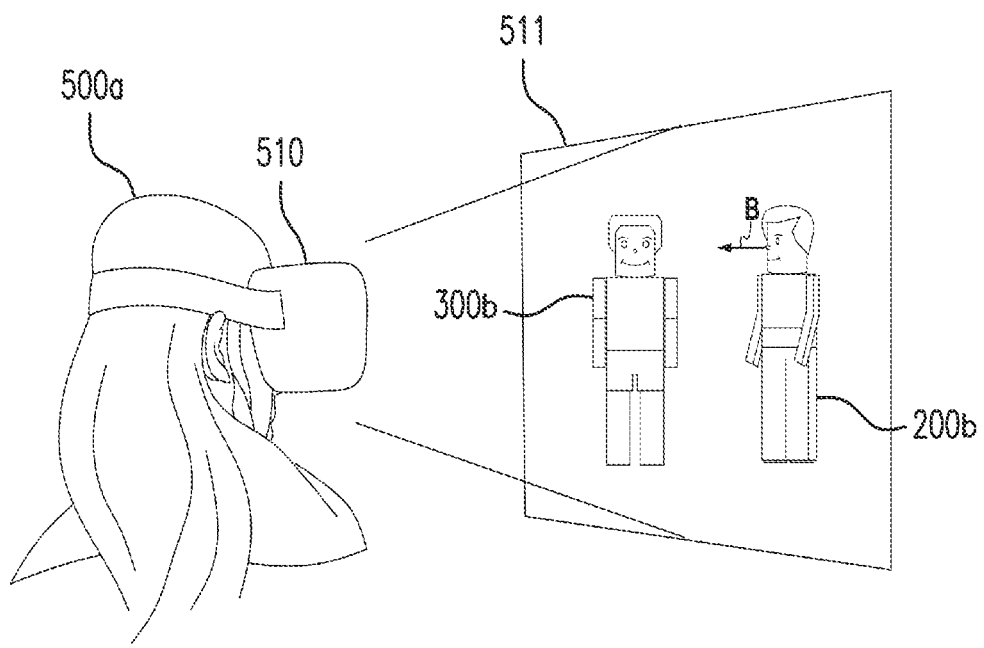

FIG. 5A and FIG. 5B illustrate a simulated reality environment for cross platforming user input between an immersive headset device (i.e., viewing device 510) and other connected devices (i.e., viewing devices 210, 310 and 410). In FIGS. 5A and 5B, the immersive headset device (i.e., viewing device 510) displays the simulated reality environment on a head mounted display (HMD) device 511.

FIG. 6 illustrates block diagram of non-immersive viewing device 210 in a simulated reality system 600. In accordance with various embodiments, the non-immersive viewing devices (e.g., viewing devices 210, 410) may include one or more sensors 225 (e.g., accelerometer 220 and gyroscope 230) as depicted in FIG. 6. The sensors 225 acquire information suitable for establishing at least one of a position or orientation of the non-immersive viewing device (e.g., viewing devices 210, 410). In FIG. 6, the communications from a non-immersive viewing devices 210 and an immersive viewing device 310 will be described in detail via server 100. The communications between viewing device 210 and other viewing devices 410 and 510 may be similar to those described between viewing devices 210 and 310. The viewing devices 210, 310, 410 and 510 include or are attached to computing devices. An example, computing device whether immersive or non-immersive viewing devices will be described in detail in relation to viewing device 210.

In accordance with various embodiments, the sensors 225 include one or more of accelerometer 220 or gyroscope 230 sensors. In various embodiments, accelerometer or gyroscope sensors can form an Inertial Measurement Unit (IMU), which acquires data for determining position or orientation of the viewing device. In other embodiments, visual data via the camera 215 or data acquired via global positioning sensors (GPS) 235, Wi-Fi data, or magnetometers can also be used to determine position and/or orientation of the viewing device. Changes in a viewing device's position can be calculated based on the device's sensors. Instances of the simulated reality environment 10, that are run on non-immersive devices (i.e., devices 210, 410), can send position and orientation data based upon the location and orientation of the device to another device 310, 410, 510 or a central server 100 of system 600. The specific means by which such data is gathered on a given class of device or operating system (OS) differ. These differences are however contemplated herein based on the application that one of ordinary skill in the art can apply according to the disclosure provided herein. In accordance with various embodiments, the sensor or sensors gather the most reliable location and/or orientation data from the viewing device 210, 310, 410, 510. The location and/or orientation data is then normalized before sending out. The normalization occurs when the application driving the devices 210, 310, 410, 510 makes remote procedure calls to the server 100, which will result in appropriate messages being transmitted to all participating devices. This can be either an application running on a mobile device (phone, tablet, laptop, Oculus Go®, Oculus Quest® etc.), or an application running on the computer that is driving a tethered Head Mounted Display (Oculus Rift®, HTC Vive Windows® Mixed Reality). The normalization follows a process for passing position, orientation, scale and/or voice information in a simulated reality multi-user environment. As discussed herein the normalization occurs across the various types of devices, paradigms, and/or platforms allowing each to interpret the message from the server 100 appropriately. This allows the data sent to the server 100 or other viewing devices 310, 510 to accurately reflect the user position, scale, orientation, and/or other suitable display characteristic of the transmitting device (i.e., viewing device 210), with respect to the virtual environment, in real time.

Figure 7:
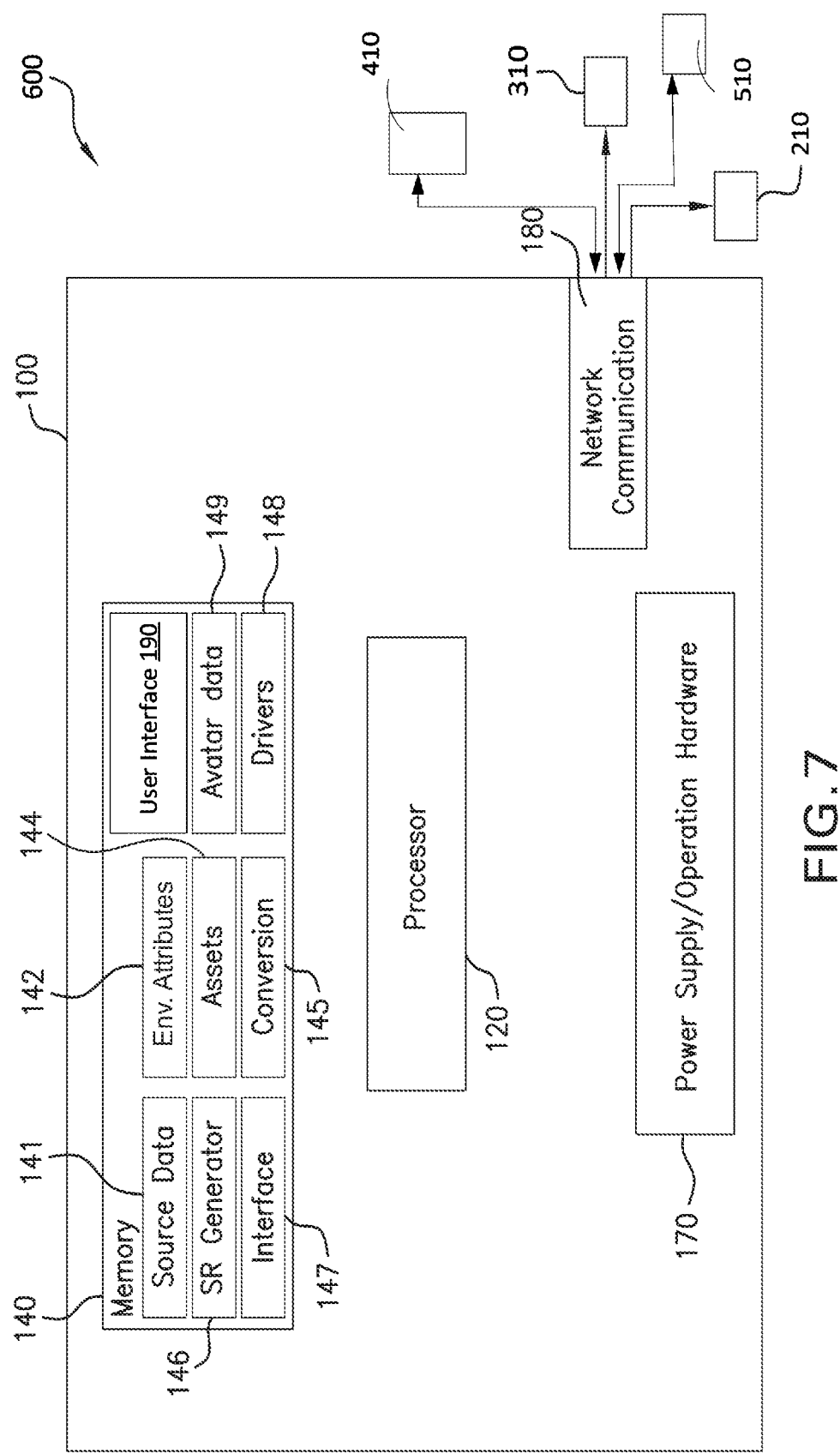
FIG. 7 illustrates a block diagram of a server in the simulated reality system of FIG. 6.

As shown in each of FIGS. 2A-5B, the location and orientation of each of the users, represented as their avatars, is transmitted to the other users. FIG. 2A depicts the relationship, position, and orientation of user 500a and 400a via computer-generated avatars 500b and 400b. If either user were to move, this information on the viewing device 210 would be updated to reflect this movement via computer-generated movement of the corresponding avatar. As indicated above, viewing device 210 can move (e.g., from direction A to direction B as illustrated between FIGS. 1A and 1B) showing a new portion of the simulated reality environment illustrated in FIG. 2B, which depicts the relationship, position, and orientation of users 400a and 300a via their computer-generated avatars 400b and 300b. The movement from direction A to direction B can be picked up by sensors 225 discussed above. The sensors 225 can produce transmitted sensor data 20 that can be transmitted to the server 100 as illustrated in FIG. 6. The transmitted sensor data 20 or information can be processed by the processor 120 of server 100, as shown in FIG. 7, operating the simulated reality environment generator 146 for converting the information to a corresponding asset position or orientation within the simulated reality environment. The simulated reality environment is computer-generated information representative of the simulated reality environment. The environment changes 30 are transmitted back to the device 210 for rendering on the viewing device 210 allowing the user of the viewing device 210 to view and interact with the environment via real world motion of the non-immersive device 210. The movement of the device 210 corresponds to the environment changes rendered on the device in such a way that movement of device 210 allows for new viewing perspectives of the environment with each movement. The effect is that the device 210 functions as a window into the virtual environment with each new location of the window showing a different aspect, perspective, or viewing direction of the environment. As the device 210 moves, for example, different zones or areas of the simulated reality environment can come into view while others go out of view.

In accordance with various embodiments, the transmitted sensor data 20 or information can be processed by the processor 120 operating the simulated reality environment generator 146 for converting the information to a corresponding asset viewing data 50. The asset viewing data 50 includes asset position and/or orientation within the simulated reality environment. The asset viewing data 50 may then be transmitted to another device 310 for rendering thereon and placing the asset in a new position or orientation within the simulated reality environment in response to movement of the viewing device 210. While not necessarily depicted on an immersive device, FIG. 3B-3C depicts an example of an updated asset position based on movement of viewing device 210. In FIG. 3B, the asset (depicted here as avatar 200b) is looking in the direction B which corresponds to the direction B shown in FIG. 2B. By moving the viewing device 210 from direction B, as best seen in FIG. 1B, to direction A, as best seen in FIG. 1A and as depicted in the differences between FIG. 2B and FIG. 2A, FIG. 3C depicts this update with the asset (again depicted in FIG. 3C as avatar 200b) facing in the direction A. Similar changes in the asset (depicted as avatar 200b) would be viewable in the immersive device 310 based on changes to the position of viewing device 210. Likewise, similar changes in the asset (depicted as avatar 200b) would be viewable in the immersive device 510 based on changes to the position of viewing device 210.

In accordance with various embodiments, the other devices (e.g., viewing devices 310, 410, 510, etc.) can also collect position/orientation data and transit it as transmitted data 40. The transmitted data 40 can be processed by the processor 120 operating the simulated reality environment generator 146 for converting the transmitted data 40 to a corresponding other asset position which can then be sent to device 210 as part of environment changes data 30. In this way, updates and changes to other assets (e.g., avatars 300b, 400b, 500b shown in FIGS. 2A-5B) can be tied into movements of the corresponding viewing device such that the movements of the corresponding viewing devices is updated to the non-immersive device 210 by updated and changed renderings of the assets displayed thereon.

Specifically, a user can join into the simulated reality environment 10, using an application running on a non-immersive device or via server 100. In accordance with various embodiments, the simulated reality environment 10 can emulate a user's head and/or hand position, on a computer generated avatar. The position of the head and/or hands can be represented in the simulated reality environment 10 such that other users see the virtual position of an emulated user position, as represented in FIGS. 2A-5B. In some embodiments, the position of the non-immersive device (i.e., viewing devices 210, 410) can also manipulate the perspective by which the user views the simulated reality environment 10. Such manipulation can be accomplished when using movable viewing devices, such as smart phones, tablets, and augmented reality glasses. In such embodiments, a user can move their viewing device (i.e., viewing devices 210, 310, 510) around them, looking in any direction, and see on their device's screen, that portion (local or remote) of the simulated reality environment 10 that would be seen where the user in the simulated reality environment 10 is looking. The correct position, orientation and point of view of the user is determined by input from the device's sensors. In accordance with various embodiments, from a perspective of the users using immersive devices such as headsets, any non-immersive user appears as an avatar with that avatar having position, orientation and movement within the environment. The position of the head and/or hands of the avatars are positioned relative to where the user is holding the viewing device. In some embodiments, additional adjustments to the head and/or hands may be made via graphical user interface input elements and/or input devices.

The above embodiments, allows for exchanges between different platforms of devices (e.g., non-immersive and immersive devices) with movement of either type of platform updating the rendered environment shown on the other platforms to depict that movement as asset movement within the virtual environment. In accordance with various embodiments, the assets are avatars representing the users of the devices. In this way, movement of the device shows up as movement of the avatar within the simulated reality environment 10 regardless of wither the user is using an immersive device or a non-immersive device. Movement within a simulated reality environment 10 is then achieved by non-immersive devices via movement of the device itself. In some embodiments, this may be limited to orientation of the asset via movement of the device. Here, orientation refers to pitch, yaw, and roll of the device corresponding to pitch, yaw, and roll of the asset. In some embodiments, this may be limited to translational movement of the device. Here, translation movement refers to forward, back, up/down of the device corresponding to forward, back, up/down, of the asset. In some embodiments, all six degrees of freedom may correspond between movement of the device and movement of the asset. In accordance with various embodiments, the correlation between movement of the device and movement of the asset may be modified to allow for more realistic movement of the asset. For example, moving the device up and down may result in the asset moving up and down in the simulated reality environment 10 absent a modification. Such behavior may seem unnatural when viewing the asset within the environment. As such, this correlation could be deleted so that even, if the viewing device is moved up and down, the corresponding asset in the environment does not also move up and down. This modification to the correlation between the viewing device and the asset may provide a more natural behavior in the simulated reality environment 10.

FIGS. 6 and 7 illustrates a block diagram of a simulated reality system 600. FIG. 6 is a block of the system 600. The system 600 can include a server 100 in communication with an immersive device 310 used by user 300a. The server 100 can also be in communication with a non-immersive device 210 used by user 200a. The communication between the non-immersive device 210 and the server 100 can include the transmission paths 25 connected via the communication network module 250. The communication between the non-immersive device 310 and the server 100 can include the transmission paths 45. In various embodiments, the viewing device 210 can include sensors 225 discussed above, including for example, the gyroscope 230 and the accelerometer 220. The viewing device 210 can include the processor 240 similar to the processors discussed below with regards to processor 120. The viewing device 210 can also include a display 211.

FIG. 7 as discussed above is a block diagram of the server 100 in system 600 of FIG. 6. The server 100 includes one or more memory storage devices 140. In various embodiments, the memory storage device 140 may include a non-transitory and tangible memory containing computer-readable instructions operable to display and adjust the display 211 of information in a simulated reality environment 10.

FIG. 7 illustrates an example of a block diagram of the server 100 for implementing the simulated reality environment. The server 100 can support and implement a portion of the systems illustrated in the other figures shown and discussed herein or can support and implement all of the systems illustrated in the other figures shown and discussed herein. For example, the server 100 may be a part of a single device or may be segregated into multiple devices that are networked or standalone. The server 100 need not include all of the components shown in FIG. 7 and described below.

In accordance with various embodiments, as illustrated in FIG. 7, the server 100 includes one or more processors 120, one or more memory storage devices 140, a power supply 170, a network communication interface 180 and/or other suitable equipment for implementation of a simulated reality environment, with each component variously in communication with each other via one or more system buses or via wireless transmission means. Each of the components will be discussed in turn below. The memory storage devices 140 include one or more of source data 141, environmental attributes 142, asset data 144, simulated reality generator 146, interface 147, conversion module 145, drivers 148 and avatar data 149.

As indicated above, the server 100 includes one or more processors 120. The processor 120 refers to one or more devices within the computing device that is configurable to perform computations via machine-readable instructions stored within the memory storage devices 140. The processor 120 can include one or more microprocessors (CPUs), one or more graphics processing units (GPUs), and one or more digital signal processors (DSPs). In addition, the processor 120 can include any of a variety of application-specific circuitry developed to accelerate the simulated reality system 100. The one or more processing elements may be substantially any electronic device capable of processing, receiving, and/or transmitting instructions. For example, the processing element may be a microprocessor or a microcomputer. Additionally, it should be noted that the processing element may include more than one processing member. For example, a first processing element may control a first set of components of the computing device and a second processing element may control a second set of components of the computing device, where the first and second processing elements may or may not be in communication with each other, e.g., a graphics processor and a central processing unit which may be used to execute instructions in parallel and/or sequentially.

In accordance with various embodiments, one or more memory storage devices 140 are configured to store software suitable to operate the simulated reality system 100. The memory stores electronic data that may be utilized by the computing device. For example, the memory may store electrical data or content, for example audio files, video files, document files, and so on, corresponding to various applications. The memory may be, for example, non-volatile storage, a magnetic storage medium, optical storage medium, magneto-optical storage medium, read only memory, random access memory, erasable programmable memory, flash memory, or a combination of one or more types of memory components. Specifically, the software stored in the memory launches immersive environments via a simulated reality environment generator 146 within the server 100. The simulated reality environment generator 146 is configured to render simulated reality environments suitable to be communicated to a display 211. In order to render the simulated reality environment, the simulated reality environment generator 146 pulls the source data 141 from memory and instantiates them in a suitably related environment provided by the generator 146 and or environmental attributes 142. The simulated reality environment generator 146 also pulls asset data 144 for positioning into the environment. As discussed above, the asset data may be supplemented by information received from sensors to determine locations, movement and, updated locations. In various embodiments, conversion engine 145 maps the asset data 144 into the environment based on input from the sensors 225. The conversion engine 145 can also modify the position/orientation information to be utilized to display and manipulate the asset in the simulated reality environment to a more natural display for the viewer.

The generator 146 is configured to provide instructions to the processor 120 in order to display the environment in the proper format such that the environment 10 is presented on the viewing device (e.g., viewing devices 210, 310) and the asset in the proper orientation to the viewer to improve the viewer experience. The generator 146 can also access information from the asset data 144, as discussed above, in order to locate the asset in the environment and/or other assets in the environment with respect to one another. The asset data 144 can receive communications from the sensors 225 via the network communication interface 180 providing information, characteristics and various attributes about the user, the user's position, actions, etc. in order to provide the system sufficient information to form, manipulate and render the assets within the simulated reality environment 10. The same applies for the avatar of other users. As discussed herein, in various embodiments, the assets are avatars representative of the user. The avatars may also be representative of the user's real-world position or orientation.

In accordance with various embodiments, the server 100 includes one or more network communication interface 180. The network communication interface 180 are configured to communicate with other remote systems. The networking/communication interface 180 receives and transmits data to and from the computing device. The network communication interface 180 may transmit and send data to the network, other computing devices, or the like. For example, the network communication interface 180 may transmit data to and from other computing devices through the network which may be a wireless network (e.g., Wi-Fi, Bluetooth, cellular network, etc.) or a wired network (Ethernet), or a combination thereof. In particular, the network may be substantially any type of communication pathway between two or more computing devices. For example, the network may be wireless, wired, or a combination thereof. Some examples of the network include cellular data, Wi-Fi, Ethernet, Internet, Bluetooth, closed-loop network, and so on. The type of network may include combinations of networking types and may be varied as desired. In some embodiments, the network communications may be used to access various aspects of the immersive platform from the cloud, another device, or dedicated server.

In various embodiments, the network communication interface 180 may also receive communications from one or more of the other systems including the viewing device 210 and/or viewing device 310. As discussed above the viewing device 210 may be a different platform type than the viewing device 310. In a number of embodiments, the server 100 uses a driver memory to operate the various peripheral devices including the operation hardware/power supply 170, and/or the network communication interface 180.

Figure 8:
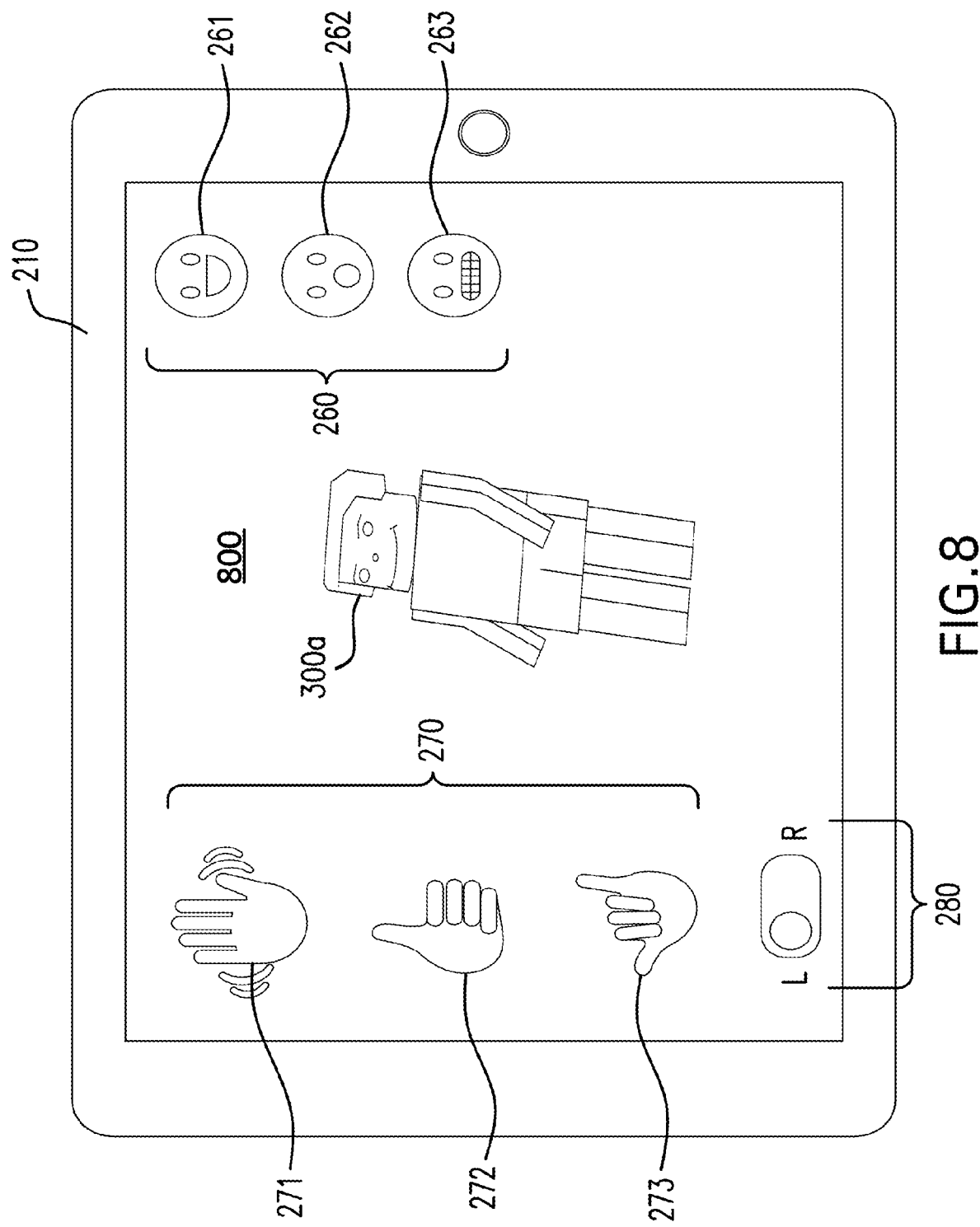
FIG. 8 illustrates a non-immersive graphical user interface of a simulated reality environment with non-orientational controls.

FIG. 8 illustrates a non-immersive graphical user interface 800 of a simulated reality environment (i.e., environment 10) with non-orientational controls displayed on viewing device 210. In accordance with various embodiments, the server 100 of system 600 includes user-friendly User Interface (UI) elements 190, stored in memory 140 for screen-based interfaces running on non-immersive viewing devices (e.g., desktop computers, laptops, smart phones, tablets and other suitable devices). One or more user interface elements 190 are shown in FIG. 8, which may be selected by a touch screen display or other user input devices. The user interface elements 190 will employ familiar UI metaphors, such as sliders, buttons, tapping and swiping, with which non-immersive users can indicate additional control elements beyond motion of the device itself. For example, the control elements may include motion and rotation around axes. For non-handheld devices such as laptops and desktop computers, positional and orientation can be indicated without movement. On handheld devices, UI elements 190 can be used to fine tune the information derived from the IMU, as well. For all screen-based devices, UI elements will allow modification of scale as well as indications of additional asset positioning. For example, in embodiments in which the asset is an avatar, the additional asset position may include avatar hand position and orientation. UI elements will also allow non-UI users to request hand and facial gestures, so that they can express themselves in effective ways that are equivalent to those of immersive such as users in fully immersed simulated reality environments. The non-immersive instances of the system 600 will respond to the user's interaction with UI elements 190 to send appropriate RPC's, which will be processed by the generator 146 allowing for the gesticulation and their visual representation on the avatar to be updated correctly, in real time to other system users. As an example, FIG. 8 illustrates a diagram of a simulated reality display of UI elements with non-orientational controls suitable for additional asset position. The UI elements may be graphical user interfaces with one or more control icons for navigation and control during operation of the simulated reality environment 10. In various examples, the UI elements include hand gestures 270 are indicated as touch screen icon buttons on the left side of the screen. Specific examples of the hand gestures 270 include a hand wave 271, a thumbs up 272, and a love you gesture 273. A positioning control 280 is shown in the lower left side of the screen of FIG. 8 with left (L)-right (R) position control via a sliding bar. In various examples, face gestures 260 are indicated as touch screen icon buttons on the right side of the screen. Specific examples of the face gestures 260 include a happy face 261, a shocked face 262, and a grimacing face 263. With the access to the face gestures 260, a user can move their representative avatar by moving the viewing device but gesticulate the avatar by pressing the gesture buttons on the screen. This allows the user to better interact with other avatars, such as avatar 300b, in a simulated reality environment 10. In FIG. 8, the avatars within the viewing capability of the window (i.e., display) of the viewing device 210 relative to the simulated reality environment is shown.

In an embodiment, the left (L) position selected by a user may cause their displayed avatar to others to move one or their left hand, leg or other body part. The right (R) position may cause their displayed avatar to others to move one of their right hand, leg or other body part.

In an embodiment, the left (L) position selected by a user may cause their displayed avatar to others to move left from the current position. The right (R) position selected by a user may cause their displayed avatar to others to move right from their current position.

In an embodiment, the graphical user interface 800 may be used by immersive viewing devices with selection entered by a controller or user input device 315 or 515, for example.

In accordance with various embodiments, the system 600 includes audio communication between assets (e.g., avatars) in the simulated reality environment 10. The users can speak into microphone 219 (FIG. 6) and hear other users speaking, via speaker 217 (FIG. 6) as well as any other sounds in the experience, regardless of whether they are in immersive devices (e.g., HMDs) or non-immersive devices (e.g., smart phone). The microphone and speaker may be part of a headset or built into the device. Audio is spatial and directional such that it comes from the location of the speaking avatar, whether they are in immersive devices or non-immersive devices. In order to avoid the cacophony of hearing many users speaking at once, users can request to tune out certain voices, or to take a subset of users into a private speaking mode.

Figure 9:
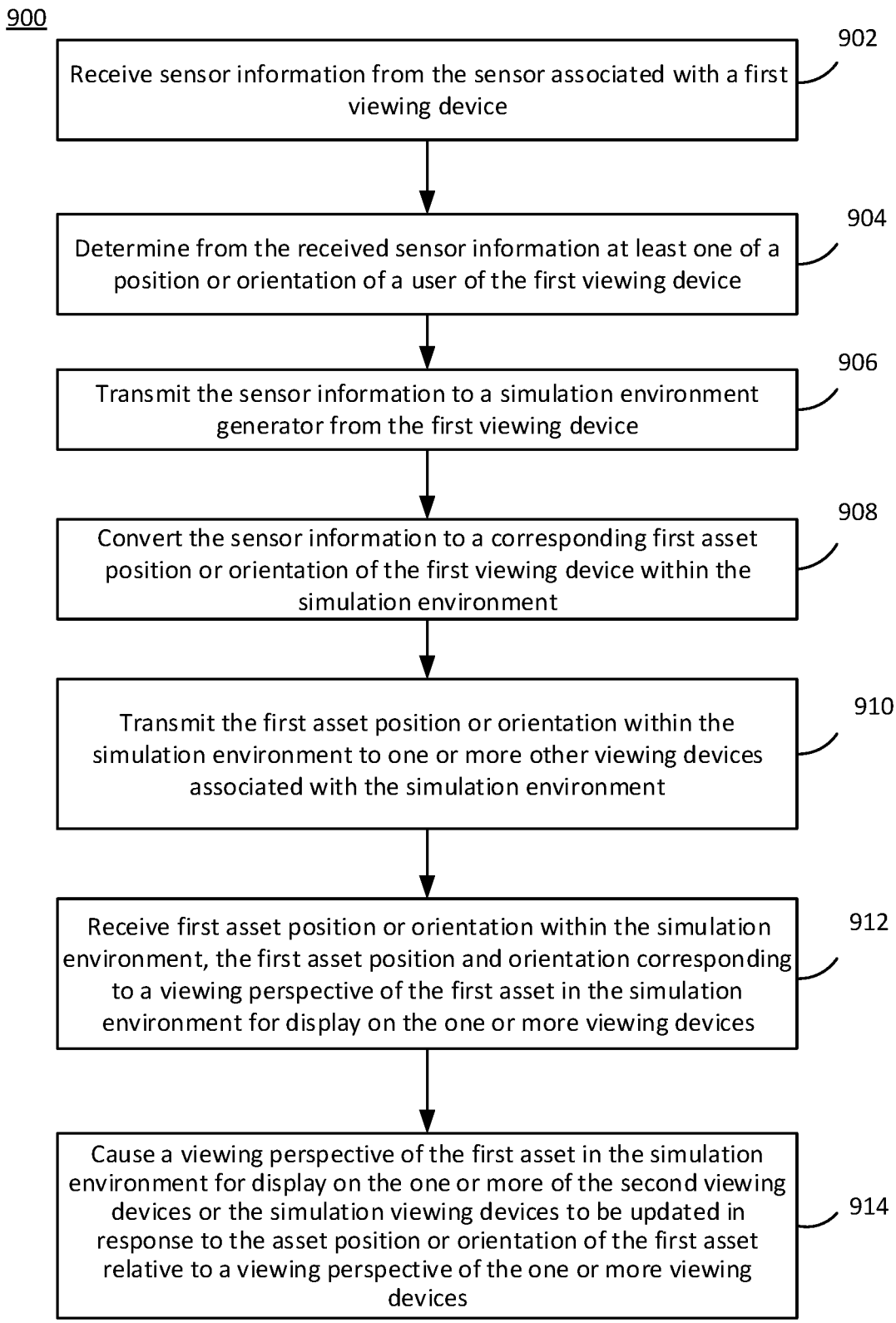
FIG. 9 illustrates a flowchart of a method for controlling an asset's position in a display of a simulated reality environment with cross platforming users.

FIG. 9 illustrates a flowchart of a method 900 for controlling an asset's position in a display of a simulated reality environment with cross platforming users. The method 900 includes, at block 902, receiving sensor information from the sensor associated with a first viewing device. The method 900 includes, at block 904, determining from the received sensor information at least one of a position or orientation of a user of the first viewing device.

The method 900 includes, at block 906, transmitting the sensor information to a simulated reality environment generator of the server 100 from the first viewing device. The method 900 includes, at block 908, converting the sensor information to a corresponding first asset position or orientation of the first viewing device within the simulated reality environment, by the simulated reality environment generator.

The method 900 includes, at block 910, transmitting the first asset position or orientation within the simulated reality environment to one or more other viewing devices associated with the simulated reality environment. The method 900 includes, at block 912, receiving first asset position or orientation within the simulated reality environment, the first asset position and orientation corresponding to a viewing perspective of the first asset in the simulated reality environment for display on the one or more viewing devices. The first asset position and orientation information may include information selected via the graphical user interface 800 to gesticulate or emote may be part of the information associated with the first asset position or orientation. The method 900 includes, at block 914, cause a viewing perspective of the first asset in the simulated reality environment for display on the one or more of the second viewing devices or the simulated reality viewing devices to be updated in response to the asset position or orientation of the first asset relative to a viewing perspective of the one or more viewing devices.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular examples only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical viewer interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A simulated reality system, comprising:
    an immersive viewing device configured to display a simulated reality environment with a first user of the simulated reality system being immersed in the simulated reality environment, a first avatar representative of a second user of the simulated reality system being provided in the simulated reality environment; and
    a mobile non-immersive viewing device located remote from the immersive viewing device, and configured to display a computer generated environment corresponding to the simulated reality environment without a third user of the simulated reality system being immersed in the simulated reality environment, the first avatar and a second avatar representative of the first user and the second user being provided in proximity to the third user in the computer generated environment and having movements within the computer generated environment respectively corresponding to movements made by the first and second users while being immersed in the simulated reality environment;
    wherein a third avatar representative of the third user is provided in the simulated reality environment so as to be in proximity to the first and second avatars, and movement of the third avatar in the simulated reality environment is caused via changes in at least one of a position and orientation of the mobile non-immersive viewing device at least partially caused by hand movements of the third user.

2. The simulated reality system of claim 1, wherein the non-immersive viewing device is a handheld device, the computer generated environment is a 2D environment and the simulated reality environment is a 3D environment.

3. The simulated reality system of claim 1, wherein movements of the third avatar in simulated reality environment are further caused by user-software interactions with the mobile non-immersive viewing device.

4. The simulated reality system of claim 3, wherein the user-software interactions cause an extremity of the third avatar to gesticulate or a face of the third avatar to express an emotion.

5. The simulated reality system of claim 4, wherein the extremity comprises a hand, a finger, or a leg of the avatar.

6. The simulated reality system of claim 5, wherein the movement of the avatar comprises at least one of the following gestures: a hand wave, a thumbs up, or a love you gesture.

7. The simulated reality system of claim 4, wherein the movement of the avatar comprises a modification of one or more facial features.

8. The simulated reality system of claim 7, wherein the modification to the one or more facial features of the avatar comprise transitioning to a facial expression to at least one of the following: a happy face, a shocked face, or a grimacing face.

9. The simulated reality system of claim 3, wherein a position or orientation of the third avatar within the simulated reality environment is changed based on any adjustments to the position or orientation of the mobile non-immersive viewing device.

10. The simulated reality system of claim 3, wherein a perspective of the simulated reality environment is changed within the computer generated environment based on at least one of a position and orientation of the mobile non-immersive viewing device.

11. The simulated reality system of claim 10, wherein a head of the avatar is positioned within the simulated reality environment relative to where hands of the user reside on the non-immersive handheld viewing device.

12. The simulated reality system of claim 1, wherein a head of the third avatar is positioned within the simulated reality environment relative to where hands of the third user reside on the mobile non-immersive viewing device.

13. The simulated reality system of claim 1, wherein at least one hand of the third avatar is position within the simulated reality environment relative to where hands of the third user reside on the mobile non-immersive viewing device.

14. A simulated reality system, comprising:
    an immersive viewing device configured to display a 3D simulated reality environment with a first user of the simulated reality system being immersed in the 3D simulated reality environment, a first avatar representative of a second user of the simulated reality system being provided in the 3D simulated reality environment; and
    a non-immersive handheld viewing device located remote from the immersive viewing device, and configured to display a 2D computer-generated environment corresponding to the 3D simulated reality environment without a third user of the simulated reality system being immersed in the 3D simulated reality environment, the first avatar and a second avatar representative of the first user and the second user being provided in proximity to the third user in the computer generated environment and having movements in proximity to the third user in the 2D computer generated environment and having movements within the 2D computer generated environment respectively corresponding to movements made by the first and second users while being immersed in the 3D simulated reality environment;

wherein a third avatar representative of the third user is provided in the 3D simulated reality environment so as to be in proximity to the first and second avatars, and movement of the third avatar in the 3D simulated reality environment is caused via changes in at least one of a position and orientation of the non-immersive handheld viewing device at least partially caused by at least one of arm, wrist and hand movements of the third user.

15. The simulated reality system of claim 14, wherein movements of the third avatar in the 3D simulated reality environment are further caused by user-software interactions with the non-immersive handheld viewing device.

16. The simulated reality system of claim 15, wherein the user-software interaction causes an extremity of the third avatar to gesticulate or a face of the third avatar to express an emotion.

17. The simulated reality system of claim 16, wherein the extremity comprises a hand, a finger or a leg of the third avatar.

18. The simulated reality system of claim 17, wherein a position or orientation of the third avatar within the 3D simulated environment is changed based on any adjustments to the position or orientation of the non-immersive handheld viewing device.

19. The simulated reality system of claim 18, wherein a head of the third avatar is positioned within the 3D simulated reality environment relative to where hands of the third user reside on the non-immersive handheld viewing device.

* * * * *